United States Patent
K et al.

(10) Patent No.: US 8,619,297 B2
(45) Date of Patent: Dec. 31, 2013

(54) PRINTING USING A PROFILE BASED ON PRINTER CAPABILITIES

(75) Inventors: Venugopal Srinivasmurthy K, Bangalore KA (IN); Hiren C. Bhatt, Bangalore Karnataka (IN); Sudhindra Venkatesh Kulkarni, Bangalore Karnataka (IN); Rajesh Bhatia, Bangalore Karnataka (IN); Harish B. Kamath, Bengalooru Karanataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 232 days.

(21) Appl. No.: 13/016,730

(22) Filed: Jan. 28, 2011

(65) Prior Publication Data
US 2012/0194850 A1 Aug. 2, 2012

(51) Int. Cl.
G06F 3/12 (2006.01)

(52) U.S. Cl.
USPC .......................................................... 358/1.15

(58) Field of Classification Search
USPC .......................................................... 358/1.15
See application file for complete search history.

(56) References Cited

U.S. PATENT DOCUMENTS

| | | | |
|---|---|---|---|
| 6,741,262 B1 | 5/2004 | Munson et al. | |
| 6,967,728 B1 | 11/2005 | Vidyanand | |
| 2007/0052994 A1 | 3/2007 | Gullett et al. | |
| 2007/0253010 A1 | 11/2007 | Selvaraj | |
| 2008/0043265 A1* | 2/2008 | Kim et al. | 358/1.9 |
| 2008/0084570 A1* | 4/2008 | Cho et al. | 358/1.9 |
| 2008/0137136 A1 | 6/2008 | Shin | |
| 2008/0259884 A1 | 10/2008 | Nguyen | |
| 2009/0051962 A1 | 2/2009 | Asai et al. | |
| 2009/0089811 A1 | 4/2009 | Ferlitsch | |
| 2009/0122343 A1 | 5/2009 | Nishitani | |
| 2010/0118330 A1* | 5/2010 | Feijoo et al. | 358/1.15 |
| 2010/0118341 A1 | 5/2010 | Ozawa et al. | |
| 2010/0157332 A1* | 6/2010 | Hamada | 358/1.9 |

FOREIGN PATENT DOCUMENTS

JP 2003241922 A 8/2003

OTHER PUBLICATIONS

"Internet Printing Protocol (IPP)"; http://datatracker.ietf.org/wg/ipp/charter/; 2 pages.
Harish, et al. "Cloud Printer With a Common User Print Experience"; PCT Application Serial No. PCT/US2010/021442 filed Jan. 20, 2010; 32 pages.
Harish, et al.; "Printer Installation at a Cloud Server" U.S. Appl. No. 12/689,254, filed Jan. 19, 2010; 25 pages.
Harish, et al.; "Web Printing"; U.S. Appl. No. 12/544,223, filed Aug. 20, 2009; 28 pages.
Joseph, Joshy; "Patterns for High Availability, Scalability, and Computing Power with Windows Azure"; May 2009; 10 pages.

* cited by examiner

Primary Examiner — Eric A Rust
(74) Attorney, Agent, or Firm — Garry A. Perry

(57) ABSTRACT

In one embodiment, a first profile of printing settings is created at a server system. Data indicative of a capability of a first printer is received at the server system. A second profile of printing settings specific to the first printer is created at the server system, the second profile including portions of the first profile consistent with the capability. A first print job is received at the server system over a web. The print job is caused to be printed at the first printer in accordance with the second profile.

18 Claims, 6 Drawing Sheets

PRINTING USING A PROFILE BASED ON PRINTER CAPABILITIES

BACKGROUND

A web enabled printer is printing device that can receive communications and print jobs via the Internet or an intranet. The web enabling functionality makes it possible for a user to send a print job from a computing device (e.g., a personal computer, laptop computer, or mobile computing device) to the printer without a direct connection (e.g. a cable, wireless, local area network, or wide area network connection) between the computing device and the printer. Advantages of printing via the web connection include that a user may have the ability to print to printers of various types, and at various locations, without being restricted to a particular network.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

The ability to utilize a variety of computing devices to print to a variety of web enabled printers presents challenges as to printer setup. Effecting user preferences in web enabled printing is complicated by the factors that a) drivers are frequently not used, b) the computing devices utilized to send print jobs to a printer often have different user interfaces, and c) some users may print to a variety of printers of different models and with different preference setup interfaces. An additional complication is that the web enabled printers may be distant from the user sending the print job and therefore may not be easily accessible for preference setup at the printer. Even if the printer is at a location that is accessible to the user, the user faces challenges that preference setup for that printer may be unfamiliar to the user and require a number of manual steps.

Embodiments described below were developed in an effort to provide a method and a system to print with settings profiles created at a server system. Because printer preferences are established in a virtual manner that is easily migrated to web enabled printers, users are more likely to utilize web enabled printing and user satisfaction with the web enabled printers is increased.

The embodiments shown in the accompanying drawings and described below are non-limiting examples. Other embodiments are possible and nothing in the accompanying drawings or in this Detailed Description of Embodiments should be construed to limit the scope of the disclosure, which is defined in the Claims.

The following description is broken into sections. The first, labeled "Environment", describes an example environment in which embodiments may be implemented. The second section, labeled "Components", describes various physical and logical components utilized to implement various embodiments. The third section, labeled as "Operation", describes example embodiments of a method to print with settings profiles. The fourth section, labeled "Example", describes example displays at a user interface, according to an embodiment of the disclosure.

Figure 1:
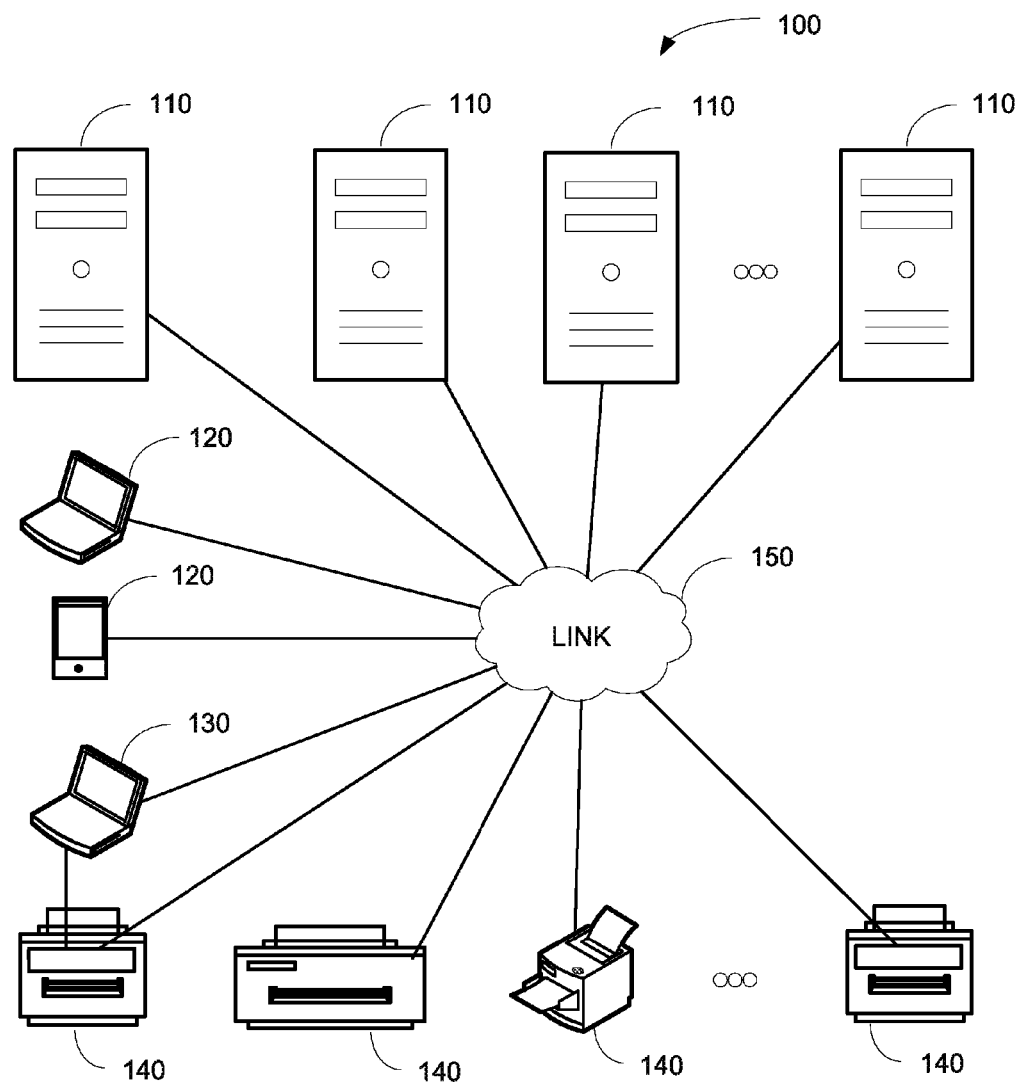
FIG. 1 depicts an example environment in which various embodiments may be implemented.

Environment: FIG. 1 depicts an example environment 100 in which various embodiments may be implemented. Environment 100 is shown to include servers 110, computing devices 120, a host computing device 130, and web enabled printers 140.

Each of servers 110 represents generally one or more computing devices capable of receiving and responding to network requests from each other and/or other computing devices via a link 150. Network requests may be sent and received utilizing a networking protocol, including but not limited to Transmission Control Protocol/Internet Protocol ("TCP/IP"), HyperText Transfer Protocol ('HTTP'), Simple Mail Transfer Protocol ("SMTP"), Extensible Messaging and Presence Protocol ("XMPP") and/or Session Initiation Protocol ("SIP").

Computing devices 120 each represent generally any computing device capable of communicating with a server 110 via a network. A computing device 120 may be a desktop computer, a laptop computer, or a mobile computing device. Example mobile computing devices include smart phones, personal digital assistants, net-books, digital media players, and the like.

Web enabled printers 140 each represent generally an assembly of components configured to produce printed images of media to produce printed output. Web enabled printers 140, for example, may be used for printing photographs, forms, advertisements, coupons and the like. As used in this specification, a "printer" includes any electronic device that prints and includes multifunctional electronic devices that perform functions such as printing, scanning, and/or copying. As used in this specification, "printer" and "printing device" are used synonymously. As used in this specification and the appended claims, a "web enabled printer" means a printer that can be connected to a web, so as to be capable of obtaining content, sending and receiving messages, and/or running applications via the web. As used in this specification and the appended claims, "web" means a system of linked hypertext documents access through the Internet or an intranet. Using a web browser, a user can view web pages that include text, images, video, and other media and navigate between these pages with hyperlinks.

In an embodiment a web enabled printer 140 may operate in a standalone mode without being connected to a host computing device. In such an example web enabled printer 140 may be configured to receive print jobs via the Internet, email or an external memory device. In another embodiment printer 140 is connected to a host computing device 130 via a cable or wireless or other means in a manner such that printer 140 may receive instructions and print jobs from the host 130. In another embodiment, web enabled printer 140 may connect directly to one or more hosts via the Internet or an intranet. In an embodiment, a web enabled printer 140 may be a printer that is not itself connected to the Internet or an intranet, but rather is connected to the web by virtue of being connected, e.g., via a cable or wireless connection, to a host computing device 130 that is connected to the web.

Computing devices 110, 120, 130, and 140 may be interconnected via link 150. Link 150 represents generally one or more of a cable, wireless, fiber optic, or remote connections via a telecommunication link, an infrared link, a radio frequency link, or any other connectors or systems that provide electronic communication. Link 150 may include, at least in part, the Internet, an intranet, or a combination of both. Link 150 may also include intermediate proxies, routers, switches, load balancers, and the like. The paths followed by link 150 between computing devices 110, 120, 130, and as depicted in FIG. 1 represent the logical communication paths between these devices, not necessarily the physical paths between the devices.

Figure 2:
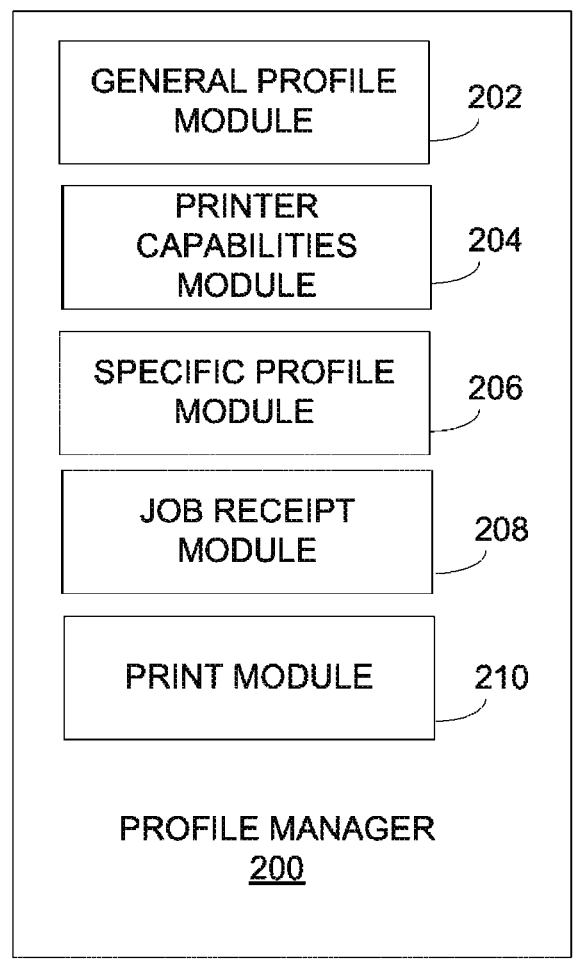
FIG. 2 depicts the physical and logical components of a profile manager according to an embodiment.

Components: FIG. 2 is an example block diagram illustrating the physical and logical components of a profile manager 200. Profile manager 200 represents generally any combination of hardware and programming configured for use to print with printer setting profiles. Profile manager 200 may be implemented in a number of environments, such as environment 100 of FIG. 1. In the example of FIG. 2, profile manager 200 is shown to include a general profile module 202, a printer capabilities model 204, a specific profile module 206, a job receipt module 208, and a print module 210.

General profile module 202 represents generally any combination of hardware and programming configured to create, at a server system, a first profile of printing settings. As used in this specification and the appended claims, a "server system" is a system comprising one computing device, or multiple physically distinct computing devices acting in concert. An example of a server system is a cloud server system, whereby shared servers, accessible to client computing devices via the web, provide resources, software, and/or data to the client devices on demand. As used in this specification and the appended claims, a "profile" means a summary, report, list, compilation or other aggregation of information. As used in this specification and the appended claims, a "printer setting" means a printer property, feature, option, or alternative that, depending upon whether or how such setting is enabled, determines how the printer operates and/or the type of output that the printer produces. Examples of printer settings include, but are not limited to, color versus black and white, portrait versus background orientation, draft versus high quality appearance, resolution in dots per inch ("dpi"), two-sided/duplex printing versus one-sided printing, finishing operations such as stapling, and private or password job printing. In embodiments, a profile of printer settings may be, but is not limited to, a profile of preferred settings for a single user, a profile of preferred settings for a set of users, a profile of preferred settings for users of a particular printing device, or a profile of preferred settings for users of a set of printing devices.

In an embodiment, the first profile is that is created is a general profile and is created, based at least in part, upon printer settings information received at the server system and over a web from a specific user. In embodiments, the received information includes printer settings preferences of a particular user for printing from a software application, for printing a content type, for printing a document type, for printing at a specific printer, for printing at a set of printers, and/or for printing at a type of printer. In an embodiment the information is received from the user as the result of the user answering questions about printing habits or preferences on an online form or questionnaire, wherein the questions are sent to a computing device by the server system and the user's answers are returned from the computing device to the server system.

In an embodiment, the user answers the preference questions utilizing a user interface at a web enabled printer, and the answers are sent to the server system directly from the web enabled printer. In another embodiment, the user may select from presented printing settings, e.g., by selecting radio buttons or "clicking on" icons or text representing preferred settings, via the user's interaction at a web site that is accessible via a web browser included within a computing device distinct from the printer. In this embodiment, the web site forwards the selected settings to the server system.

In an embodiment, the first profile that is created at the server system is a general profile created at least in part based upon usage data received at the server system over the web or another network connection. As used in this specification and the appended claims, "usage data" means data regarding one or multiple printing operations, and can include, but is not limited to, data regarding a user, a type of document, a type of content, or a printer type. In an embodiment, the usage data that is received is data for a single user. In an embodiment, the usage data that is received is data for a single user at a single printer. For example, the received data may be data that a specific user has established a pattern of printing Microsoft PowerPoint® presentations, at a specific printer, with settings for two pages per media sheet, single side printing, 600 dpi resolution. In an embodiment, the usage data that is received is data for a single user at a set of printers. For example, the received data may be data that a specific user has established a pattern of printing PDF documents, at multiple printers, at one page per media sheet, with double sided/duplex printing, and at 300 dpi resolution.

In other embodiments, the usage data that is received is data for a set of users. For example, the usage data that is received may be usage data for a each user among a set of users having a same or similar community or demographic, including but not limited to occupation, employer, age, family size, children of a certain age in the household, or geography. In another embodiment, the received usage data includes data for a set of users printing a particular content type. Examples of content types for which data may be received are graphics, photo, online book, recipe, map, email, coloring page, news, investment report, coupon, and greeting card content. In an example, usage data may be received that is data for a set of users who, without regard to geography, printed 11 inch×17 inch posters at an HP Designjet® Z6100 series printer during a defined time period. In another embodiment, usage data may be received that is data for a set of users that is at least partially defined by geography. For example, usage data may be receive that is data for a set of users who printed 11 inch×17 inch posters at an HP Designjet® Z6100 series printers located in New York, N.Y. during a defined time period.

In another embodiment, the usage data received at the server system over the web or another network connection includes data for a user or users when printing documents of a same document type. For example, the data may include an aggregation of users' printing preferences when the users are printing documents utilizing an PDF document type, as indicated by ".pdf" filename extension. Usage data can be received for other document types, including but not limited to documents in Microsoft Word® format (as indicated by a ".doc" or other filename extension that is associated with Microsoft Word® documents) and documents in Microsoft Excel® format (as indicated by an ".xls" or other filename extension associated with Microsoft Excel®).

In another embodiment, the usage data received at the server system includes data for a user or users when printing a type of content. In an embodiment, the data for printing a type of content from a particular software application is without regard to a document type or filename extension. In an embodiment, it is discerned based upon metadata tags or other markup capabilities that a document has been printed using a particular software application, even if the document name or filename extension is ambiguous as to the source of the document. For example, it might be discerned based upon the presence of a "Photoshop® edit" metadata tag in a document with a ".jpg" filename extension that the document was edited utilizing Adobe Photoshop®. Likewise, it might be discerned from a document with a ".txt" filename extension, based upon the presence of a "Word® edit" metadata tag in the document that the document was sent to print from Microsoft Word® application.

In another embodiment, the usage data received at the server system includes data for a user or users of a type of printer. As used in this specification and the appended claims, a "type" of printer includes printers of a model name, model number, market category and/or any of a number of other classification schemes. In examples, received data for a type of printer might include preferences for jobs printed with Hewlett-Packard Photosmart® printers, or preferences for jobs printed with a particular model of printer such as the Hewlett-Packard Photosmart® Premium C310 printer. In another example, the received data for a type of printer may include printer preferences for users of printers classified by predicted type of user, e.g., "home/office", "SBM" ("Small/Medium Business"), or "Enterprise" printers. In another example, the received data for a type of printer may include printer preferences for users of printers classified by predicted type of use, e.g., "graphics", "photo", "all-in-one", "multifunction", "portable" or "form feed" printers. In another example, the received data for a type of printer may include printer preferences for users of printers classified by the printing method or printing technology, e.g., "inkjet" or "laser" printers.

In an embodiment, the first profile is stored at the server system and is accessible to a user such that the user can modify his/her general printing preferences. In one embodiment, the user may access the first profile via the web and personalize his/her general printing preferences profile via interaction with a user interface at a web enabled printer. In another embodiment, the user may access the general profile and modify his/her general printing preferences profile by accessing a web site via a web browser.

In an embodiment, the first profile that is created is a general profile for a user or a set of users that print content from a first software application, and the first profile may be assigned for use in printing content from a second software application. In an embodiment, the first profile is assignable or shareable by the user with other users via the first user sending an affirmative instruction to the server system. In an example, the instruction to share may be sent by the sharing user from a control panel at the web enable printer. In another example, the instruction to share may be sent by the sharing user interacting with a web site via a computing device other than the printer. In another example, the created general profile of printing preferences is automatically shared by the server system with other users and/or with other computing devices, pursuant to a distribution list maintained at the server system. In embodiments, the first profile is shared via the sending of URL link to the first profile that is stored at the server system. In embodiments, the first profile is shared via the sending of a document (e.g., a XML document or a Word document) that includes the first profile. The shared document may include a URL link to the first profile stored at the server system.

Printer capabilities module 204 represents generally any combination of hardware and programming configured to receive, at the server system, data indicative of a capability or capabilities of a first printer. Printer capabilities that may or may not be uniform across a set of printers include, but are not limited to, color versus black and white printing, the ability to automatically duplex, job finishing capabilities such as stapling and sorting, printing resolution, display screen resolution, the thumbnail image sizes supported, and the presence of a touchscreen.

In an embodiment, data indicative of capabilities of the printer is received directly from the web enabled printer via the Internet or an intranet. In another embodiment, the data indicative of capabilities of a printer is received from a computing device distinct from a web enabled printer, via a network connection. For example, the printer capabilities module 204 may receive the data from a server or other computing device dedicated to providing printer capabilities information for a number of printers. In another example, the printer capabilities module 204 may be configured to retrieve the printer capabilities information from a memory, within the server system, that stores capabilities and specification information for a set of printers. As used in this specification and the appended claims, to "receive" data indicative of capabilities of a printer is inclusive of receiving the data via affirmatively retrieving the data from a computing device or storage component (e.g., receiving via a "pull"), and is also inclusive of receiving the data by virtue of another computing device or storage component having sent the data to the usage module (e.g., receiving via a "push" from the other computing device).

Specific profile module 206 represents generally any combination of hardware and programming configured to create at the server system a second profile of printing settings. This second profile of printer settings is specific to the printer for which the printer capabilities module 204 received capabilities data and includes portions of the first profile that are consistent with the capabilities of that printer. In an example, a first profile that is created by the general profile module 202 may list a particular user's printing preferences as color, two sided printing, 600 dpi resolution, and stapled. Continuing with this example, we assume that the user selects a first printer as the destination for a print job to be sent, with the first printer supporting two sided printing and 600 dpi resolution, but not supporting color or staple finishing. In this example, the created second profile for that printer includes two sided printing and 600 dpi resolution. The created second profile does not include the color or staple finishing preference that were in the first profile, as the color and staple preferences are not consistent with the capabilities of the selected printer.

In an embodiment, a second profile that is a specific profile created for a first printer can be automatically assigned as a default profile for use with other printers that have a same set of capabilities as the first printer. In an embodiment, if a user owns multiple printers under a same user name, the second profile that is a specific profile created for one printer may be automatically assigned for use with other printers that are assigned a common user name and have the same capabilities as the first printer. In another embodiment, if a user owns multiple printers under different user names and wants to migrate the printer-specific profile to apply to all of his/her printers, the user can do this from a portal web site, or from a control panel at the web enabled printer, by affirmatively associating the second profile with the other printers.

Job receipt module 208 represents generally any combination of hardware and programming configured to receive, at the server system over a web, a first print job. As used in this specification and the appended claims, a "print job" is a file or set of files that is submitted to be printed. The print job may be received utilizing a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP"). In an embodiment, the sending computing device may be desktop, laptop, or mobile computing device that is connected to the web, the sending initiated by a user at a user interface included in such device. In another embodiment the print job may originate at the same web enabled printer for which the printer capabilities module 204 received capabilities data and for which the specific profile module 206 created a second profile. For example, a user may send a print job via a printer application accessible at a control panel of a first web enabled printer, which results a print job being received at the server system.

Print module 210 represents generally any combination of hardware and programming configured to cause printing of the print job at the first printer in accordance with the second profile. In embodiments, the print job includes instructions as to how the content is to be printed. In embodiments, printing in accordance with the second profile comprises utilizing the second profile to determine where raster image processing of the print job occurs. As used in this specification, "raster image processing" means the process of utilizing instructions as to how the content is to be printed to apply digital information regarding print job content to, create a raster or bitmap image of the content. The instructions may be expressed in a number of various languages and formats, including but not limited to HPGL/2 (Hewlett-Packard Graphics Language 2), PostScript, PDF (Portable Document Format), JPEG (Joint Photographic Experts Group standard), TIFF (Tagged Image File Format), PCL3 (Printer Command Language 3) and PCL 6 (Printer Command Language 6). In an example, a determination can be made at the server system as to whether the print job is in a page description language or format that is supported by the printer. If the print job's page description language or format is not supported by the printer, raster image processing of the print job can take place at the server system prior to sending of the print job to the printer for output. If the print job's language or format is supported by the printer, the print job may be sent to the printer such that raster image processing occurs at the printer prior to the output of the print job upon a media.

Figure 3:
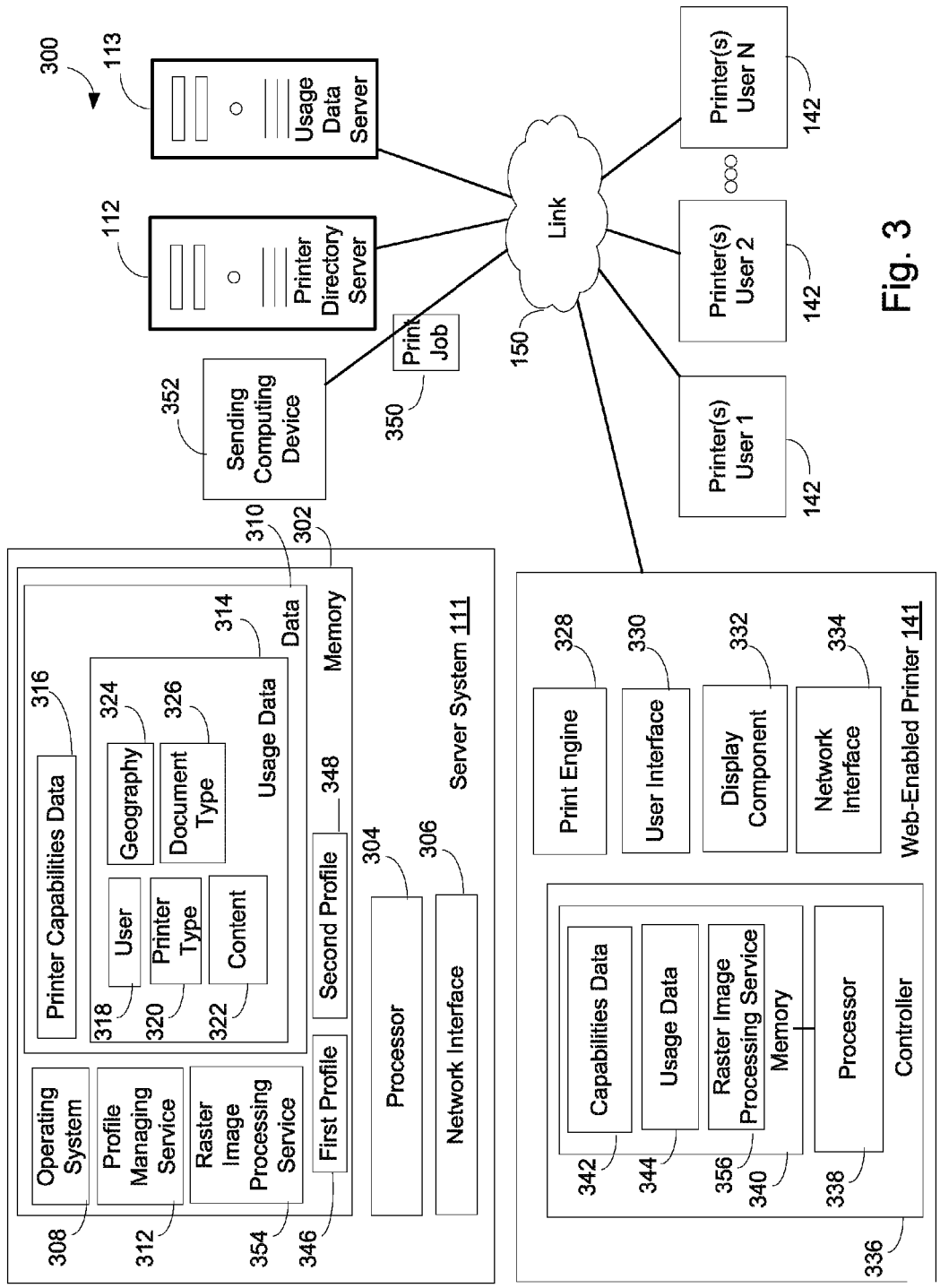
FIG. 3 depicts an example profile managing service according to an embodiment.

Profile manager 200 may be implemented in a number of environments, such as environment 300 of FIG. 3. Environment 300 includes a server system 111, a printer directory server 112, a usage data server 113, a first web enabled printer 141, and a plurality of other web enabled printers 142, interconnected via link 150. Application server system 111 is shown to include a memory 302, a processor 304, and a network interface 306. In a given implementation, memory 302 may represent multiple memories, and processor 304 may represent multiple processors. In an embodiment, the application server system 111 may include a number of software components that are stored in a computer-readable medium, such as memory 302, and are executable by processor 304. In this respect, the term "executable" includes a program file that is in a form that can be directly (e.g., machine code) or indirectly (e.g., source code that is to be compiled) performed by the processor 304. An executable program may be stored in any portion or component of memory 302.

Memory 302 is shown to include operating system 308, data 310, profile managing service 312, first profile 346, second profile 348, and raster image processing service 354. Operating system 308 represents generally any software platform on top of which other programs or applications such as profile managing service 312 run. Examples include Linux® and Microsoft Windows®.

Data 310 represents generally a collection of information stored in memory 302, the information available to be utilized by profile managing service 312 implement printing with settings profiles. In an example, data 310 may include usage data 314 and printer capabilities data 316. Usage data 314 represents generally data regarding one or multiple printing operations, and in this example includes user data 318, printer type data 320, content data 322, geography data 324, and document type data 326. User data 318 represents generally information regarding printing operations and preferences of a user or group of users. Printer type data 320 represents generally information regarding printers of a model name, model number, market category, technology type, and/or other classification scheme. Content data 322 represents generally information regarding the subject matter of print jobs. Geography data 324 represents generally information regarding the geographies in which users and/or printers are located. Document type data 326 represents generally information regarding the type of document or file that the print job is formatted in. Printer capabilities data 316 represents generally data indicative of the capabilities of web enabled printers, including web enabled printers 141 and 142.

Profile managing service 312 represents generally any programming, that, when executed, implements the functionality of the profile manager 200 of FIG. 2. In particular, profile managing service 312, when executed by processor 304, is responsible for creating, at a server system 111, a first profile 346 of printing settings. In an embodiment, the first profile 346 is that is created is a general profile and is created, based at least in part, upon usage data 314. Usage data 314 utilized in creating the first profile 346 may include, but is not limited to, user data 318, printer type data 320, content data 322, geography data 324 and document type data 326. In an embodiment, usage data 314 may be received at server system 111 via the web from web enabled printer 141. In embodiments, usage data 314 may be received at server system 111 from a usage data server 113 or other computing device distinct from web enabled printer 141 that is dedicated to usage information for a number of users and printers 142. In an embodiment the usage data 318 is received at server system 111 from usage data server 113 via a web. In an embodiment the usage data 314 is received at server system 111 from usage data server 113 via a LAN or WAN connection.

Profile managing service 312 is additionally responsible for receiving, at the server system 111 printer capabilities data 316. In an embodiment, printer capabilities data 316 is received directly from the web enabled printer via the Internet or an intranet. In another embodiment, the printer capabilities data 316 is received from a printer directory server 112 server or other computing device distinct from a web enabled printer 141 and dedicated to providing printer capabilities information for a number of printers. In another embodiment, the profile managing service 312 may be configured to retrieve printer capabilities information from elsewhere in memory 302 within the server system 111.

Profile managing service 312 is additionally responsible for creating at the server system 111 a second profile 348 of printing settings. This second profile 348 of printer settings is specific to the web enabled printer 341 for which capabilities data was received 316 (from the printer 341 directly or from print directory server 112) and includes portions of the first profile 346 that are consistent with the capabilities of that printer 341.

Profile managing service 312 is additionally responsible for receiving, at the server system 111 over a web 150, a first print job 350. In an embodiment, the sending computing device 352 may be desktop, laptop, or mobile computing device that is connected to the web 150, the sending initiated by a user at a user interface included in such device. In another embodiment the print job 350 may originate at the same web enabled printer 341 for which the second profile 348 was created.

Profile managing service 312 is additionally responsible for causing printing of the print job 350 at web enabled printer 341 in accordance with the second profile 348. In an embodiment, printing in accordance with the second profile 348 comprises utilizing the second profile 348 to determine whether raster image processing of the print job takes place at raster image processing service 354 at server system 111 or at raster image processing service 356 at web enabled printer 141. In an example, printing including rasterizing at the printer 141 may be caused in accordance with the second profile 348, the second profile 348 having been created in consideration of a first profile 346 user preference for rasterizing at the printing device when available and printer capabilities data 316 for that printer 141.

Network Interface 306 represents generally any combination of hardware and programming configured for electronically connecting application server system 111 to link 150. In an embodiment, the network interface 306 may comprise a network interface card, a network adapter, a network interface controller, and or a LAN adapter.

Web enabled printer 141 represents generally a computing device capable of accessing application server system 111, via link 150, to receive print job and to produce printed output from the print job, to and communicating information relating to the print job and/or the printed output back to the application server system 111. Web enabled printer 141 is shown to include a print engine 328, a user interface 330, a display component 332, a network interface 334, and a controller 336. Print engine 328 represents generally any combination of hardware and programming capable of producing printed output from the subscribed-for content obtained from the application server system 111. In particular, print engine 328 utilizes imaging material such as ink or toner to form a desired image on a print medium.

User interface 330 represents generally any combination of hardware and programming that enables a user to enter commands at printer 141. In an embodiment, user interface 330 may be implemented through one or more physical buttons. Display component 332 represents generally any combination of hardware and programming that enables a user to receive information and/or communications at printer 141. In an embodiment, display component 332 may be implemented through a display screen to produce a visual display. In another embodiment, display component may include a speaker to additionally or alternatively provide an auditory display. An auditory display may incorporate speech and/or non-speech output. In an embodiment, user interface 330 and display component 332 are combined in the form of a touchscreen interface. In an example, user interface 330 and display component 332 may be a touchscreen device and include a combination of hardware and programming capable of presenting a visual display of content for viewing by a user and of receiving a request or other instructions from a user via the user's interaction, e.g., via a touch, with the touchscreen. Network interface 334 represents generally any combination of hardware and programming configured for electronically connecting web enabled printer 141 to link 150.

As used in this example, controller 336 represents generally any combination of elements capable of acting as an embedded computing device to coordinate the operation of print engine 328, user interface 330, display component 332, and network interface 334. In a given implementation, the controller 336 includes a processor 338 and a memory 340. The processor 338 may represent multiple processors, and the memory 340 may represent multiple memories. Memory 340 may include printer capabilities data 342 and usage data 344 that can be retrieved by, or sent to, profile managing service 312 of the application server system 111, as is discussed in paragraphs [00038] and [00039] herein. In this example, memory 40 also includes a raster image processing service 356, which can be utilized to implement raster image processing at the printer 141 for a print job 350 in a page description language or format supported by the printer 141.

In the foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 4:
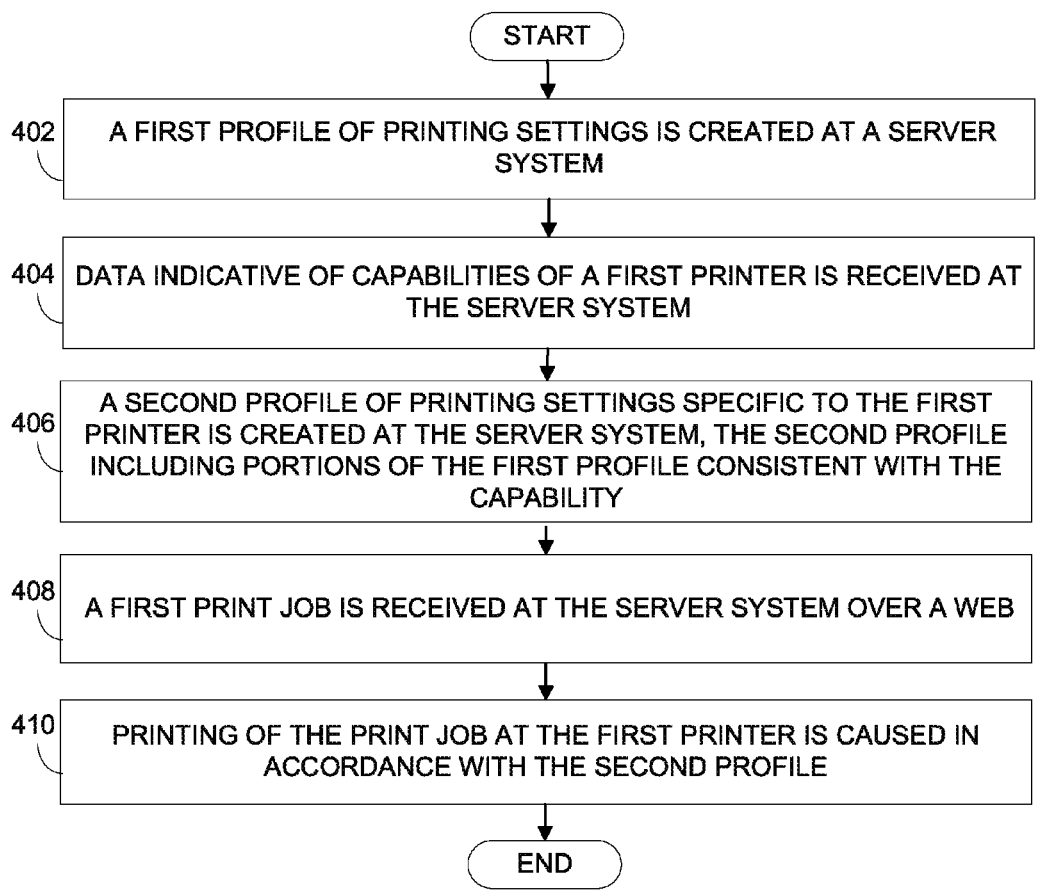
FIGS. 4 and 5 are example flow diagrams depicting embodiments of a method to print with settings profiles.
Figure 5:
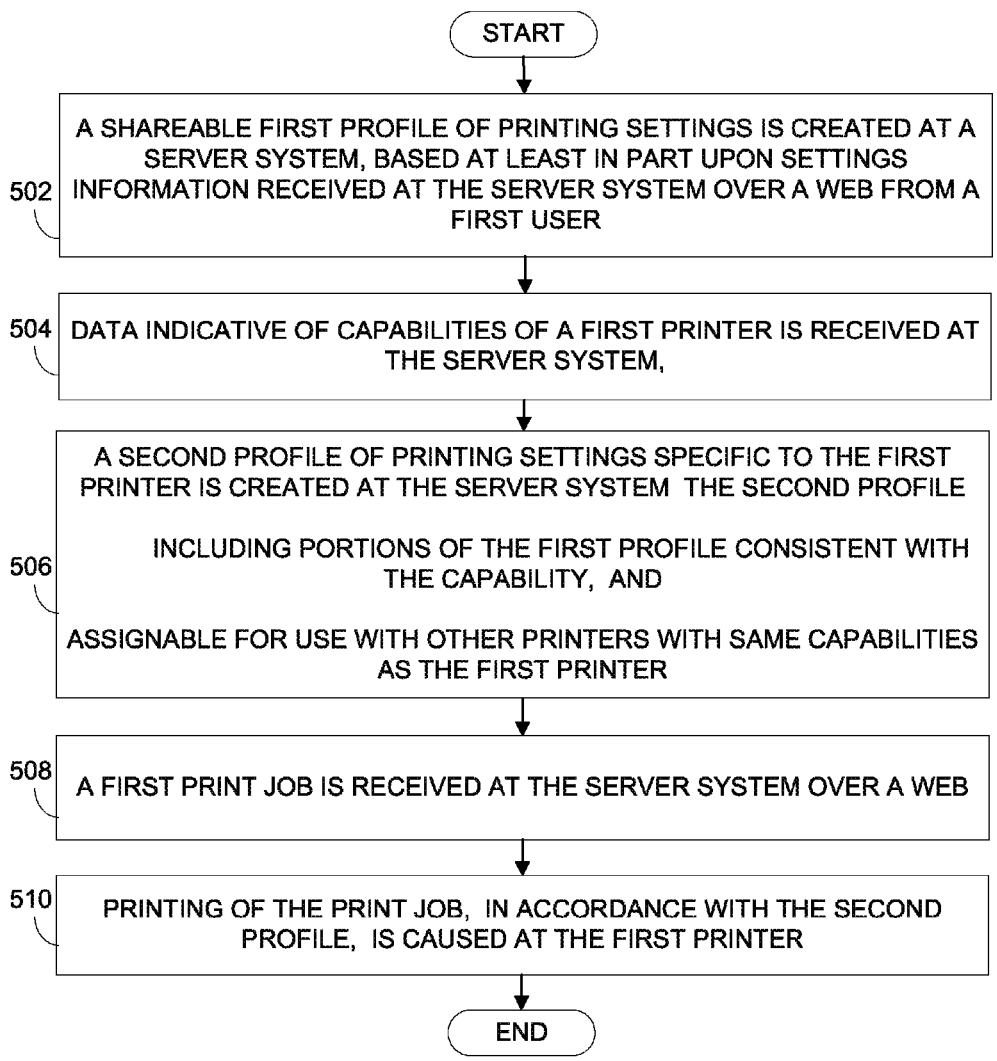

Operation: FIGS. 4 and 5 are flow diagrams depicting example embodiments of a method to print with settings profiles. In discussing FIGS. 4 and 5, reference may be made to the diagrams of FIGS. 1-3 to provide contextual examples. Implementation, however, is not limited to those examples.

Starting with FIG. 4, a first profile of printing settings is created at a server system (block 402). Referring back to FIG. 2, the general profile module 202 may be responsible for implementing block 402.

Continuing with the flow diagram of FIG. 4, data indicative of a capability or capabilities of a first printer is received at the server system (block 404). Referring back to FIG. 2, the printer capabilities module 204 may be responsible for implementing block 404.

Continuing with the flow diagram of FIG. 4, a second profile of printing settings specific to the first printer is created at the server system, the second profile including portions of the first profile consistent with the capability (block 406). Referring back to FIG. 2, the specific profile module 206 may be responsible for implementing block 406.

Continuing with the flow diagram of FIG. 4, a first print job is received at the server system over a web (block 408). Referring back to FIG. 2, the job receipt module 208 may be responsible for implementing block 408.

Continuing with the flow diagram of FIG. 4, printing of the print job at the first printer is caused in accordance with the second profile (block 410). Referring back to FIG. 2, the print module 210 may be responsible for implementing block 410.

Moving on to FIG. 5, in a particular implementation, a shareable first profile of printing settings is created at a server system. The first profile is sharable, via sending of a URL, or sending of a document including the first profile. The first profile is created, based at least in part, upon settings information received, at the server system over a web, from a first user (block 502). Referring back to FIG. 2, the general profile module 202 may be responsible for implementing block 502.

Continuing with the flow diagram of FIG. 5, data indicative of a capability or capabilities of a first printer is received at the server system (block 504). Referring back to FIG. 2, the printer capabilities module 204 may be responsible for implementing block 504.

Continuing with the flow diagram of FIG. 5, a second profile of printing settings specific to the first printer is created at the server system. The second profile includes portions of the first profile consistent with a capability or capabilities of the first printer. The second profile is assignable for use with other printers with same capabilities as the first printer (block 506). Referring back to FIG. 2, the specific profile module 206 may be responsible for implementing block 506.

Continuing with the flow diagram of FIG. 5, a first print job is received at the server system over a web (block 508). Referring back to FIG. 2, the job receipt module 208 may be responsible for implementing block 508.

Continuing with the flow diagram of FIG. 5, the print job is caused to be printed, in accordance with the second profile, at the first printer (block 510). Referring back to FIG. 2, the print module 210 may be responsible for implementing block 510.

Figures 6A, 6B:
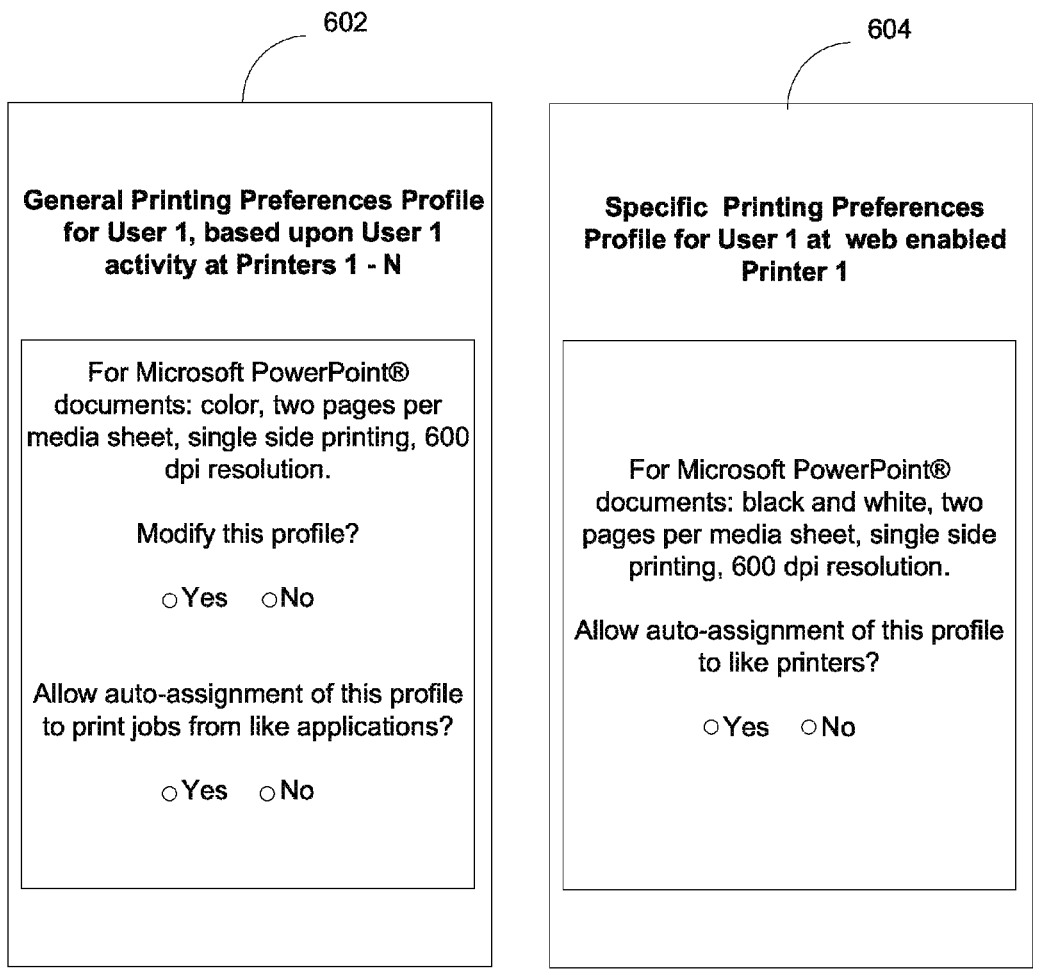
FIGS. 6a and 6b are a screen shots depicting example displays at a user interface utilized in printing with settings profiles, according to an embodiment.

Examples: FIG. 6a is an example screen shot of a display 602 that may be presented to a user via user interface at a web enabled printer. In embodiments, this display 602 additionally or alternatively may be presented to a user via a web site accessible to any web enabled computing device. In this example, the display 602 presents a "User 1" with a first profile that is a general preferences profile for User 1 for printing of Microsoft PowerPoint® documents. In this example, the first profile was created at server system utilizing usage data that relates to User 1's activity at set of printers ("1–N"). Based on such activity, the created first profile states that User 1 prefers to print Microsoft PowerPoint®, documents utilizing color, two pages per media sheet, single side printing, and 600 dpi. The presented profile is modifiable by User 1 at the web enabled printer. The user is additionally presented with a choice of allowing automatic assignment of this profile to print jobs originating from other presentation software applications.

FIG. 6b is an example screen shot of a display 604 that may be presented to a user via user interface 330 at the web enabled printer. In embodiments, this display 602 additionally or alternatively may be presented to a user via a web site accessible to any web enabled computing device. In this example, the display 604 presents "User 1" with a second profile that includes a preferences profile for User 1 that is specific to web enabled "Printer 1". The second profile is for print jobs originating from a Microsoft PowerPoint® application. Assume for this example that Printer 1 is a black and white only printer and does not have duplexing capability. The second profile is created the second profile that is created, and includes portions of the first profile that are consistent with the capabilities of Printer 1. Thus, the second profile does not include the color or duplexing preferences of User 1 that appear in the first profile. When User 1 sends a print job to Printer 1 via the web, the server system causes the print job to be printed in accordance with the second profile. The user is presented with a choice of allowing automatic assignment of the second profile to other printers.

Conclusion: The diagram of FIG. 1 is used to depict an example environment in which various embodiments may be implemented. Implementation, however, is not so limited. FIGS. 2 and 3 show the architecture, functionality, and operation of various embodiments. Various components illustrated in FIGS. 2 and 3 are defined at least in part as programs. Each such component, portion thereof, or various combinations thereof may represent in whole or in part a module, segment, or portion of code that comprises one or more executable instructions to implement any specified logical function(s).

Each component or various combinations thereof may represent a circuit or a number of interconnected circuits to implement the specified logical function(s).

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 4 and 5 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A non-transitory computer readable medium storing computer executable instructions that when executed implement a method to print with settings profiles, comprising:
   creating, at a server system, a first profile of printing settings, wherein the first profile is for printing content from a first software application, and is assignable for use in printing content from a second application;
   receiving, at the server system, data indicative of a capability of a first printer;
   creating at the server system a second profile of printing settings specific to the first printer, the second profile including portions of the first profile consistent with the capability;
   receiving, at the server system over a web, a first print job; and
   causing printing of the print job at the first printer in accordance with the second profile.

2. The medium of claim 1, wherein creating the first profile is based at least in part upon setting information received, at the server system over a web, from a first user.

3. The medium of claim 1, wherein the first profile is shareable.

4. The medium of claim 1, wherein the first profile is accessible for modification by a user.

5. The medium of claim 1, wherein the first profile is created at least in part based upon usage data.

6. The medium of claim 5, wherein the usage data is received at the server system over the web.

7. The medium of claim 5, wherein the usage data comprises data for a single user.

8. The medium of claim 5, wherein the usage data comprises data for documents of a same content type.

9. The medium of claim 5, wherein the usage data comprises data for a same document type.

10. The medium of claim 5, wherein the usage data comprises data for a defined set of users.

11. The medium of claim 5, wherein the usage data comprises data for a geography.

12. The medium of dam 5, wherein the usage data comprises data for a printer type.

13. The medium of claim 1, wherein the second profile is automatically assigned for use with printers other than the first printer that have the same capability as the first printer.

14. A system to print in accordance with profiles, the system comprising a non-transitory computer readable medium storing computer executable instructions comprising:
   general profile module, configured to create, at a server system, a first profile of printing settings;
   a printer capabilities module, configured to receive, at the server system, data indicative of a capability of a first printer;
   a specific profile module, configured to create at the server system a second profile of printing settings specific to the first printer, the second profile including portions of the first profile consistent with the capability, wherein the second profile is automatically assigned for use with printers other than the first printer that have the same capability as the first printer;
   a job receipt module, configured to receive, at the server system over a web, a first print job; and
   a print module, configured to cause printing of the print job at the first printer in accordance with the second profile.

15. The system of claim 14, wherein creating the first profile is based at least in part upon setting information received, at the server system over a web, from a first user.

16. The system of claim 14, wherein the first profile is created at least in part based upon usage data.

17. The system of claim 14, wherein a determination of where raster image processing of the print job occurs is made based at least in part on the second profile.

18. A method to print in accordance with settings profiles, comprising:
   creating, at a server system, a first profile of printing settings, wherein the first profile is sharable, via sending of a URL, or sending of a document including the first profile, and wherein the first profile is created, based at least in part, upon setting information received, at the server system over a web, from a first user;
   receiving, at the server system, data indicative of a capability of a first printer;
   creating at the server system a second profile of printing settings specific to the first printer, the second profile including portions of the first profile consistent with the capability, and assignable for use with another printer with the same capability;
   receiving, at the server system over a web, a first print job; and
   causing printing of the print job at the first printer in accordance with the second profile.

* * * * *

UNITED STATES PATENT AND TRADEMARK OFFICE
CERTIFICATE OF CORRECTION

PATENT NO. : 8,619,297 B2  
APPLICATION NO. : 13/016730  
DATED : December 31, 2013  
INVENTOR(S) : Venugopal Srinivasmurthy K et al.

Page 1 of 1

It is certified that error appears in the above-identified patent and that said Letters Patent is hereby corrected as shown below:

On the title page, in item (75), Inventors, in column 1, line 4, delete "Kulkami," and insert -- Kulkarni, --, therefor.

In the Claims

In column 13, line 15, in Claim 12, delete "dam" and insert -- claim --, therefor.

Signed and Sealed this  
Second Day of September, 2014

Michelle K. Lee  
*Deputy Director of the United States Patent and Trademark Office*